(12) United States Patent
Reich (10) Patent No.: US 12,533,940 B2
(45) Date of Patent: Jan. 27, 2026

(54) STRUCTURAL ELEMENT FOR A MOTOR VEHICLE CHASSIS

(71) Applicant: Bayerische Motoren Werke Aktiengesellschaft, Munich (DE)

(72) Inventor: Michael Reich, Rohrbach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 312 days.

(21) Appl. No.: 18/039,996

(22) PCT Filed: Jan. 21, 2022

(86) PCT No.: PCT/EP2022/051337
§ 371 (c)(1),
(2) Date: Jun. 2, 2023

(87) PCT Pub. No.: WO2022/161866
PCT Pub. Date: Aug. 4, 2022

(65) Prior Publication Data
US 2024/0001751 A1     Jan. 4, 2024

(30) Foreign Application Priority Data

Jan. 27, 2021   (DE) .................... 10 2021 101 730.0

(51) Int. Cl.
*B60K 5/12*     (2006.01)
*B60K 1/04*     (2019.01)
(Continued)

(52) U.S. Cl.
CPC .................. *B60K 5/12* (2013.01); *B60K 1/04* (2013.01); *B62D 21/152* (2013.01); *B62D 25/082* (2013.01); *B60K 2001/0411* (2013.01)

(58) Field of Classification Search
CPC .... B60K 5/12; B60K 1/04; B60K 2001/0411; B62D 21/152; B62D 25/082
See application file for complete search history.

(56) References Cited

U.S. PATENT DOCUMENTS 4,840,424 A * 6/1989 Asoh ...................... B62D 21/11
296/204
4,909,565 A * 3/1990 Harasaki .............. B62D 25/082
296/198
(Continued)

FOREIGN PATENT DOCUMENTS

CN          1733541 A       2/2006
CN        101037118 A       9/2007
(Continued)

OTHER PUBLICATIONS

International Search Report (PCT/ISA/210) issued in PCT Application No. PCT/EP2022/051337 dated Apr. 25, 2022 with English translation (6 pages).

(Continued)

*Primary Examiner* — Jacob B Meyer
(74) *Attorney, Agent, or Firm* — Crowell & Moring LLP (57) ABSTRACT

A structural element for a motor vehicle chassis, particularly a chassis of an electrically powered motor vehicle, includes at least two securing sections and a central section which connects the two securing sections. Each securing section can be secured to an outer surface of a motor mounting element of the chassis and/or to an outer surface of a longitudinal member of the chassis.

8 Claims, 7 Drawing Sheets

(51) Int. Cl.
    *B62D 21/15*    (2006.01)
    *B62D 25/08*    (2006.01)

(56)         References Cited

U.S. PATENT DOCUMENTS

| | | | | |
|---|---|---|---|---|
| 4,955,664 | A * | 9/1990 | Friedrich | E02F 9/10 |
| | | | | 296/204 |
| 6,511,096 | B1 * | 1/2003 | Kunert | B62D 21/11 |
| | | | | 280/124.109 |
| 6,631,942 | B1 * | 10/2003 | Kitagawa | B62D 21/152 |
| | | | | 296/203.02 |
| 8,857,902 | B2 * | 10/2014 | Sekiguchi | B62D 25/082 |
| | | | | 296/187.1 |
| 9,067,627 | B2 * | 6/2015 | Hara | B62D 21/152 |
| 9,428,040 | B2 * | 8/2016 | Shibata | B62D 25/082 |
| 9,428,223 | B2 * | 8/2016 | Gilbert | B62D 24/00 |
| 9,452,668 | B2 * | 9/2016 | Merkel | B62D 21/11 |
| 9,630,486 | B2 * | 4/2017 | Yamada | B60K 28/14 |
| 9,688,311 | B2 * | 6/2017 | Yamamoto | B62D 25/025 |
| 9,821,853 | B2 * | 11/2017 | Torikawa | B62D 25/025 |
| 9,925,856 | B2 * | 3/2018 | Ewert | B62D 21/18 |
| 10,183,698 | B2 * | 1/2019 | Ta | B62D 21/12 |
| 10,202,028 | B1 * | 2/2019 | Jarocki | B62D 21/152 |
| 2006/0027993 | A1 | 2/2006 | Takayanagi et al. | |
| 2013/0119704 | A1 * | 5/2013 | Amano | B60K 1/00 |
| | | | | 296/187.1 |
| 2014/0265441 | A1 * | 9/2014 | Ameloot | B62D 21/155 |
| | | | | 296/187.1 |
| 2014/0374176 | A1 * | 12/2014 | Merkel | B60K 1/04 |
| | | | | 180/69.1 |

FOREIGN PATENT DOCUMENTS

| | | | | |
|---|---|---|---|---|
| CN | 103101425 | A | 5/2013 | |
| CN | 104870294 | A | 8/2015 | |
| CN | 109484489 | A | 3/2019 | |
| CN | 110475705 | A | 11/2019 | |
| DE | 38 08 314 | C1 | 8/1989 | |
| DE | 602 08 741 | T2 | 7/2006 | |
| DE | 10 2008 030 450 | A1 | 12/2009 | |
| DE | 10 2012 104 519 | A1 | 11/2013 | |
| DE | 102013106433 | A1 * | 12/2014 | ............... B60K 1/04 |
| DE | 10 2015 113 283 | A1 | 2/2017 | |
| DE | 102016009395 | A1 * | 2/2018 | ............... B60K 1/00 |
| DE | 102018113205 | A1 * | 3/2019 | ............ B62D 21/11 |
| DE | 102018126641 | A1 * | 4/2020 | ........... B60K 5/1208 |
| DE | 102022102840 | B4 * | 10/2023 | ............. B62D 21/11 |
| FR | 2985952 | A1 * | 7/2013 | ............... B60K 5/1216 |
| FR | 3042464 | A1 * | 4/2017 | ............... B60K 5/12 |
| JP | 2013-203243 | A | 10/2013 | |
| WO | WO 2013/110871 | A2 | 8/2013 | |

OTHER PUBLICATIONS

German-language Written Opinion (PCT/ISA/237) issued in PCT Application No. PCT/EP2022/051337 dated Apr. 25, 2022 (10 pages).

German-language Search Report issued in German Application No. 10 2021 101 730.0 dated Oct. 4, 2021 with partial English translation (10 pages).

English translation of Chinese-language Office Action issued in Chinese Application No. 202280007706.3 dated Jun. 11, 2025 (8 pages).

* cited by examiner

STRUCTURAL ELEMENT FOR A MOTOR VEHICLE CHASSIS

BACKGROUND AND SUMMARY

The invention relates to a structural element for a chassis of a motor vehicle and to a motor vehicle comprising such a structural element.

The prior art discloses motor vehicles, in particular electrically driven motor vehicles, with a chassis. In electrically driven motor vehicles, an electric drive can be accommodated in a front-end part of the motor vehicle. In addition, further components, such as components of a power electronics system of the motor vehicle and/or a connection panel of a traction battery of the motor vehicle for example, are also arranged in the front-end part.

In the effort to achieve a compact traffic area (low weight, small space requirement in city traffic) and a generous passenger compartment, the front-end part of such electrically driven motor vehicles is usually designed to be relatively short. However, this short front-end part forms the crumple zone of the motor vehicle, and for this reason stringent requirements are in place with respect to the crash behavior of the front-end part.

In the event of a collision between the motor vehicle and a rigid barrier, a post or a deformable offset barrier, there may be a short circuit in a connection panel and/or in a battery, in particular a traction battery, of the motor vehicle. Such a short circuit may then set the motor vehicle on fire. The short circuit may occur due to components in the front-end part of the motor vehicle being displaced backward in the direction of the battery of the connection panel.

The object of the present invention is to provide a structural element for a chassis of a motor vehicle, by means of which structural element the risk of a short circuit occurring in the vehicle in the event of a collision can be reduced.

This object is achieved by a structural element and a motor vehicle in accordance with the independent claims.

The structural element according to the invention for a chassis of a motor vehicle, in particular for a chassis, which is a constituent part of a vehicle body of the motor vehicle in particular, of an electrically driven motor vehicle, comprises at least two fastening sections and a central section that connects the two fastening sections. According to the invention, the fastening sections can each be fastened to an outer surface of a motor mount shoe of the chassis and/or to an outer face of a longitudinal member, which may also be called the motor mount, of the chassis. The motor vehicle may be a passenger motor vehicle.

Owing to the configuration according to the invention, the backward displacement of components, for example of a drive unit, in the front-end part of the motor vehicle may be minimized by way of impact energy being dissipated to supporting structures of the chassis. The structural element may also be referred to as a capture element, in particular a capture bracket, which sufficiently intercepts the component before it meets the region of a passenger compartment.

The motor mount shoe, which may also be referred to as a longitudinal member shoe or as a shoe of a front longitudinal member, may be a member structure which connects the longitudinal member, a front end wall of the passenger compartment and a vehicle body bottom to one another or serves as a joining element for these vehicle body constituent parts. The motor mount shoe has the task of distributing forces introduced via the longitudinal member to the end wall and the vehicle body bottom.

In a preferred configuration, the central section can be arranged on the chassis between a component, in particular a drive unit, for example an electric motor, of the motor vehicle and/or a front axle of the motor vehicle on the one hand and a battery, in particular a traction battery of the motor vehicle, and/or a power electronics system of the motor vehicle on the other hand. The battery is preferably arranged in the region below a passenger compartment of the motor vehicle and extends, for example, approximately as far as an end wall of the motor vehicle, which end wall forms a front end of the passenger compartment of the motor vehicle. In addition, the structural element may be able to be arranged between the component and/or the front axle on the one hand and an end wall of the motor vehicle on the other hand.

Owing to this configuration, the risk of a short circuit occurring may be further reduced.

The structural element can preferably be arranged on the chassis in such a way that the central section extends in a motor vehicle transverse direction.

In a preferred configuration, the structural element can also be arranged on the chassis in such a way that it extends substantially in a horizontal plane of the motor vehicle.

The structural element preferably also comprises a further fastening section which is formed on the central section and by means of which the structural element can be fastened to an end wall of the chassis.

Owing to this configuration, the impact energy may be directed into the chassis more efficiently, as a result of which the risk of a short circuit occurring in the event of a collision may be reduced.

In a preferred configuration, the structural element is formed as a bent pipe or a bent flat steel bar.

This configuration renders possible simple and cost-effective production of the structural element.

The fastening sections and/or the further fastening section each preferably comprise/comprises at least one fastening opening for receiving a fastening screw and/or for receiving a fastening rivet.

This configuration renders possible more efficient introduction of the impact energy into the chassis, as a result of which the risk of a short circuit occurring may be further reduced.

The motor vehicle according to the invention may be, in particular, an electrically driven motor vehicle. The motor vehicle according to the invention comprises a chassis and a structural element according to the invention. The chassis comprises a motor mount shoe and/or at least one longitudinal member. According to the invention, the motor mount shoe and/or the at least one longitudinal member are/is provided with at least two outer faces, and the fastening sections of the structural element are each fastened to one of the outer faces of the motor mount shoe and/or of the longitudinal member.

The structural element is preferably an assembly part which is fitted to the chassis, for example by way of a screw connection. Accordingly, the structural element is not welded to the chassis or the vehicle body during vehicle body shell construction, but rather only fitted during the course of vehicle assembly.

As a result, the structural element may be readily omitted from other drive variants of the motor vehicle which, for example, do not have a battery or do not have a heavy component, i.e. a drive assembly in the front-end part for example.

Details and further advantages of the structural element according to the invention and of the motor vehicle according to the invention will be explained with reference to two exemplary embodiments that are described below.

DETAILED DESCRIPTION OF THE DRAWINGS

The disclosure relates to a structural element 20 for a chassis 120 of a motor vehicle 100, in particular for a chassis of an electrically driven motor vehicle. The structural element 20 comprises at least two fastening sections 30, 32 and a central section 40 that connects the two fastening sections 30, 32. The fastening sections 30, 32 can each be fastened to an outer face 132 of a motor mount shoe 130 of the chassis 120 and/or to an outer face 142 of a longitudinal member 140 of the chassis 120.

The disclosure also relates to a motor vehicle 100, in particular an electrically driven motor vehicle. The motor vehicle comprises a chassis 120 and a structural element 20 according to the disclosure. The chassis 120 comprises a motor mount shoe 130 and/or at least one longitudinal member 140. The motor mount shoe 130 and/or the at least one longitudinal member 140 are/is provided with at least two outer faces 132, 142. The fastening sections 30, 32 of the structural element 20 are each fastened to one of the outer faces 132, 142 of the motor mount shoe 130 and/or of the longitudinal member 140.

According to the exemplary embodiments, the motor vehicle 100 has two longitudinal members 140. The longitudinal members 140 extend substantially in the direction of travel F of the motor vehicle 100.

The structural element 20 can be fastened to the motor mount shoe 130 at its outer surface 132, to the longitudinal member 140 at its outer face 142 or both to the motor mount shoe 130 at its outer face 132 and also to the longitudinal member 140 at its outer face 142. The longitudinal member 140 is usually welded to the motor mount shoe 130.

The structural element 20 may also be referred to as a crash bracket or capture bracket.

The outer faces 132 of the motor mount shoe 130 point from a center of the motor vehicle 10 to the outside, i.e. to the outer skin of the motor vehicle 100.

Similarly, the outer faces 142 of the longitudinal members 140 point to the outside, that is to the outer skin of the motor vehicle 100.

The central section 40 of the structural element 20 and/or the structural element 20 itself may be able to be arranged or may be arranged on the chassis 120 between a drive unit 180 of the motor vehicle 100 and/or a front axle 150 of the motor vehicle 100 on the one hand and a battery 160, in particular a traction battery of the motor vehicle 100, and/or a power electronics system 170 of the motor vehicle 100 on the other hand. This configuration is shown in FIGS. 1 and 4 to 6, in particular.

The drive unit 180 may also be referred to as the drive topology or as the highly integrated electric drive topology and comprise an electric motor and a transmission.

The chassis 120 may also comprise a front fender 144. Here, the front fender 144 may extend substantially in the motor vehicle transverse direction Q or extend transversely to the direction of extent of the longitudinal members 140.

The structural element 20 may be able to be arranged or may be arranged on the chassis 120 in such a way that, when the structural element 20 is in its intended installation position in the motor vehicle 100, the central section 40 extends in a motor vehicle transverse direction Q. The motor vehicle transverse direction Q extends transversely to a direction of travel F of the motor vehicle 100 and extends in a horizontal plane of the motor vehicle 100. This configuration is shown in FIG. 1, in particular.

Figure 1:
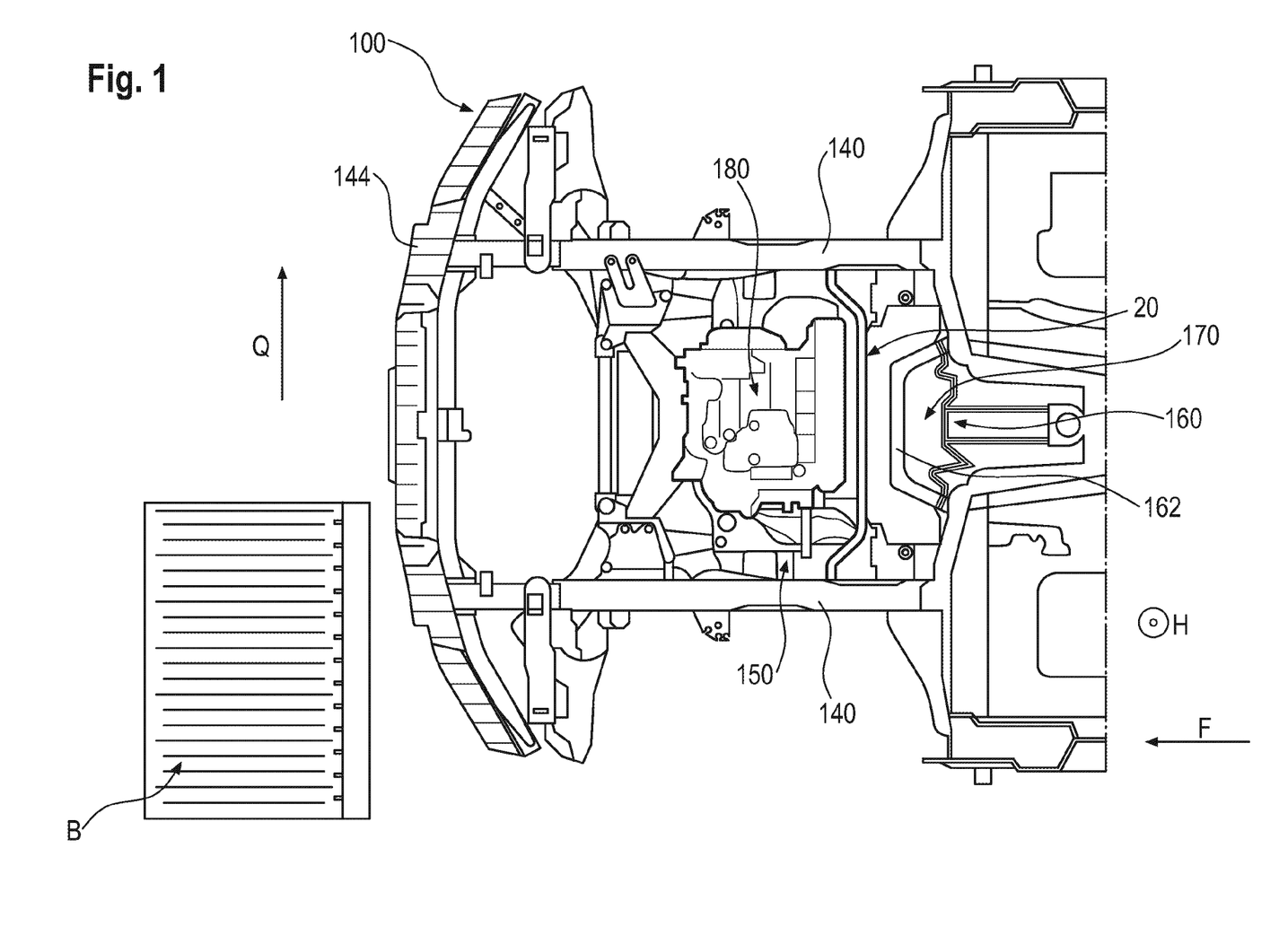
FIG. 1 is a schematic view of a front-end part of a motor vehicle comprising a structural element according to a first exemplary embodiment.
Figure 2:
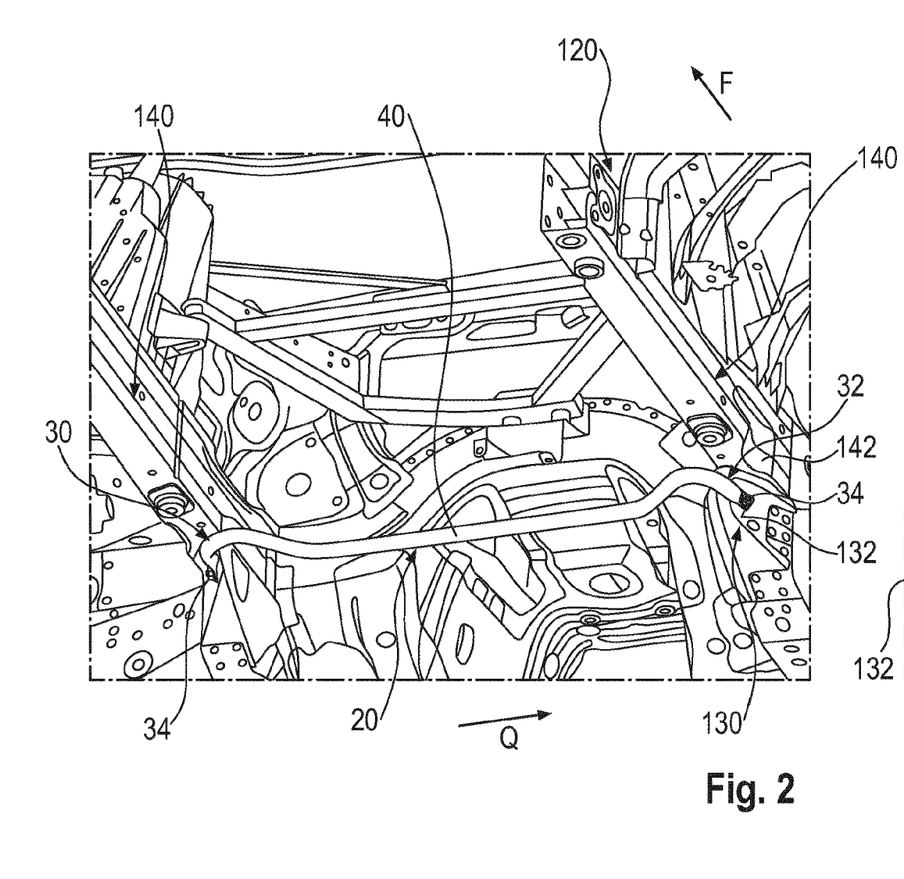
FIG. 2 is a schematic view of a detail of the front-end part from FIG. 1.
Figure 3:
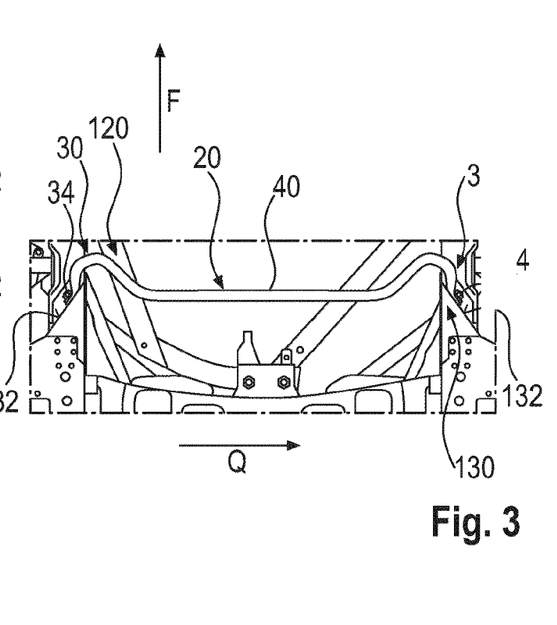
FIG. 3 is a further schematic view of a detail of the front-end part from FIG. 1.
Figure 12:
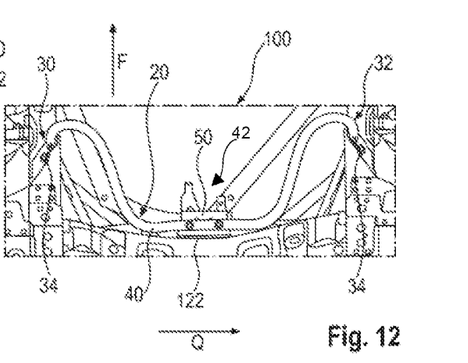
FIG. 12 is a further schematic view of a detail of the front-end part from FIG. 11.

FIGS. 1, 3 and 12 in particular likewise show that the structural element 20 according to both exemplary embodiments may have, in a plan view, a tub-like shape that is open substantially at the front.

The structural element 20 may be arranged or may be able to be arranged on the chassis 120 in such a way that the structural element 20 extends substantially in a horizontal plane of the motor vehicle 100. The horizontal plane runs parallel to a horizontal ground surface on which the motor vehicle 100 rests or moves.

Figure 11:
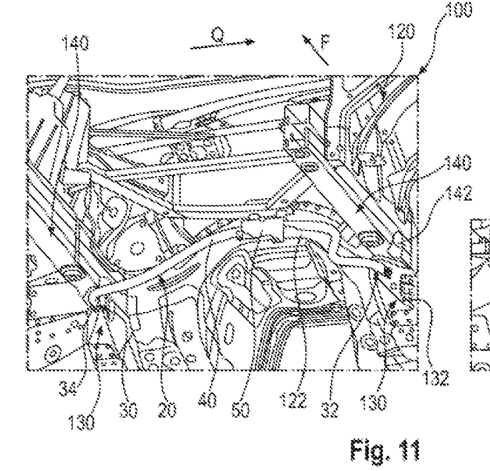
FIG. 11 is a schematic view of a detail of a front-end part of a motor vehicle having a structural element according to a second exemplary embodiment.

The structural element 20 may also comprise a further fastening section 42 which is formed on the central section 40 and by means of which the structural element 120 is fastened or can be fastened to an end wall 122 of the chassis 120. This is shown in FIGS. 11 and 12, in particular. Owing to this configuration, improved introduction of force into the end wall 122 can take place in the event of a crash.

The structural element 20 can also comprise a holding profile 50. The connection of the structural element 20 or of the fastening section 42 to the end wall 122 can be performed indirectly via the holding profile 50, as is shown in FIGS. 11 and 12, in particular. The holding profile 50 may be screwed, riveted and/or welded to the end wall 122 and screwed and/or riveted to the fastening section 42.

The structural element 20 may be formed as a bent pipe or a bent flat steel bar. Here, the structural element 20 may have an approximately constant cross section. The fastening sections 30, 32 and/or the further fastening section 42 can each be formed by shaping the pipe or the flat steel bar.

The fastening sections 30, 32 and/or the further fastening section 42 may each comprise at least one fastening opening 34 for receiving a fastening screw and/or for receiving a fastening rivet. The fastening opening 34 may be formed by piercing the fastening sections 30, 32.

Accordingly, corresponding openings may be formed on the outer faces 142 of the longitudinal members 140 and/or on the outer faces 132 of the motor mount shoe 130, the fastening screw and/or the fastening rivet being able to be guided through the openings in order to fasten the structural element 20 to the chassis 120. Owing to this configuration, stable fastening between the structural element 20 and the chassis 120 of the motor vehicle 100 can be established.

Since the structural element 20 acts on the longitudinal member 140 or the motor mount shoe 130 from the outside, i.e. engages around the longitudinal member 140 or the motor mount shoe 130, low screwing forces can be used when fastening the structural element 20 by means of screws. As a result, the flow of force may be optimized and the fastening screw may be relieved of loading in the event of a crash.

FIGS. 7 to 10 show illustrations of a collision between the motor vehicle and a deformable offset barrier as well as a post, the motor vehicle being formed without the structural element according to the disclosure. These illustrations illustrate the risk of a connection panel 162 of the battery 160 being acted on by the drive unit 180 in the event of a collision. Such an action on the connection panel 162 can lead to a short circuit in the battery 160, as a result of which the motor vehicle 100 may catch fire.

Figure 4:
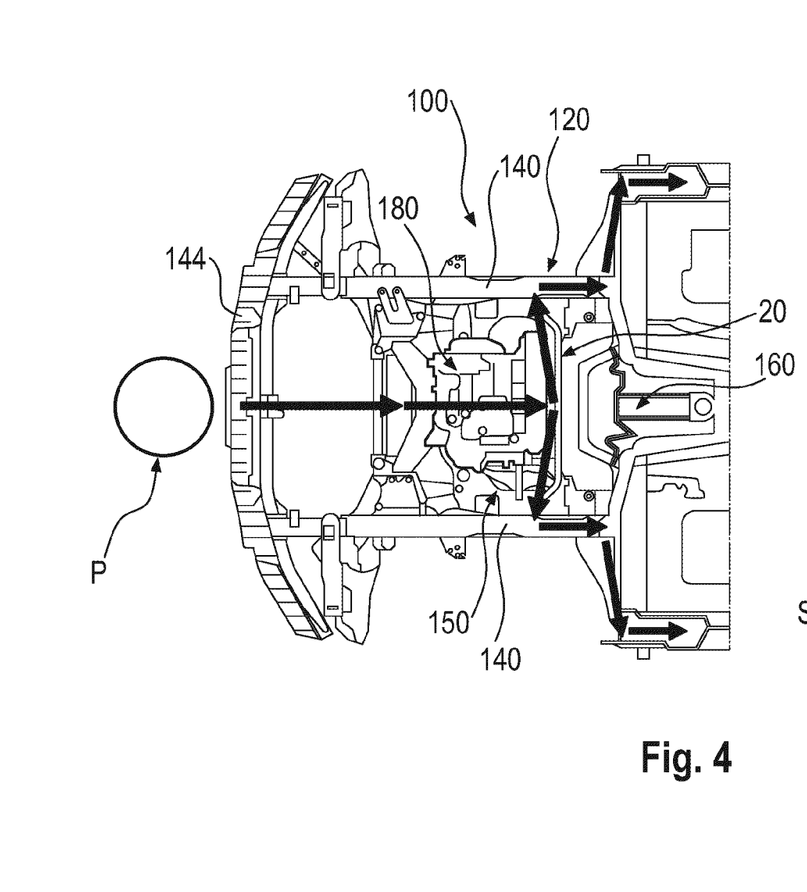
FIG. 4 is a schematic illustration of the introduction of force into a vehicle body of the motor vehicle in the event of a frontal collision with a post.
Figure 5:
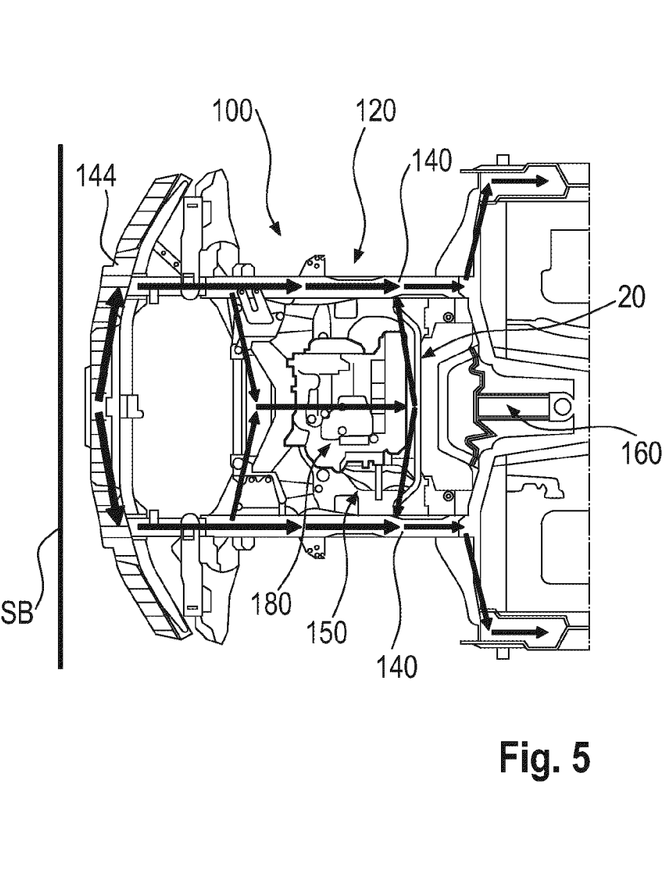
FIG. 5 is a schematic illustration of the introduction of force into the vehicle body in the event of a frontal collision with a rigid barrier.
Figure 6:
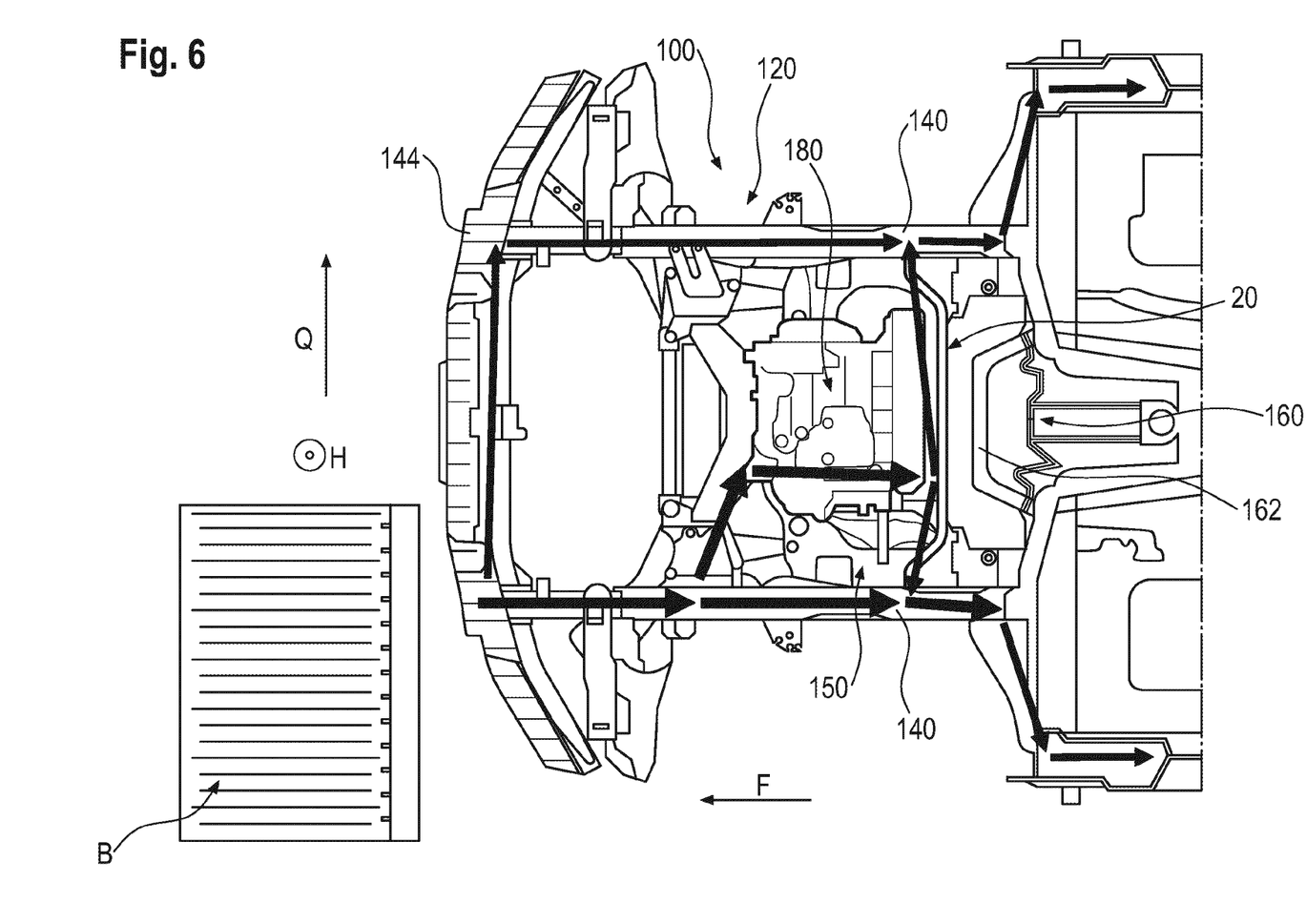
FIG. 6 is a schematic illustration of the introduction of force into the vehicle body in the event of a frontal collision with a deformable offset barrier.
Figure 7:
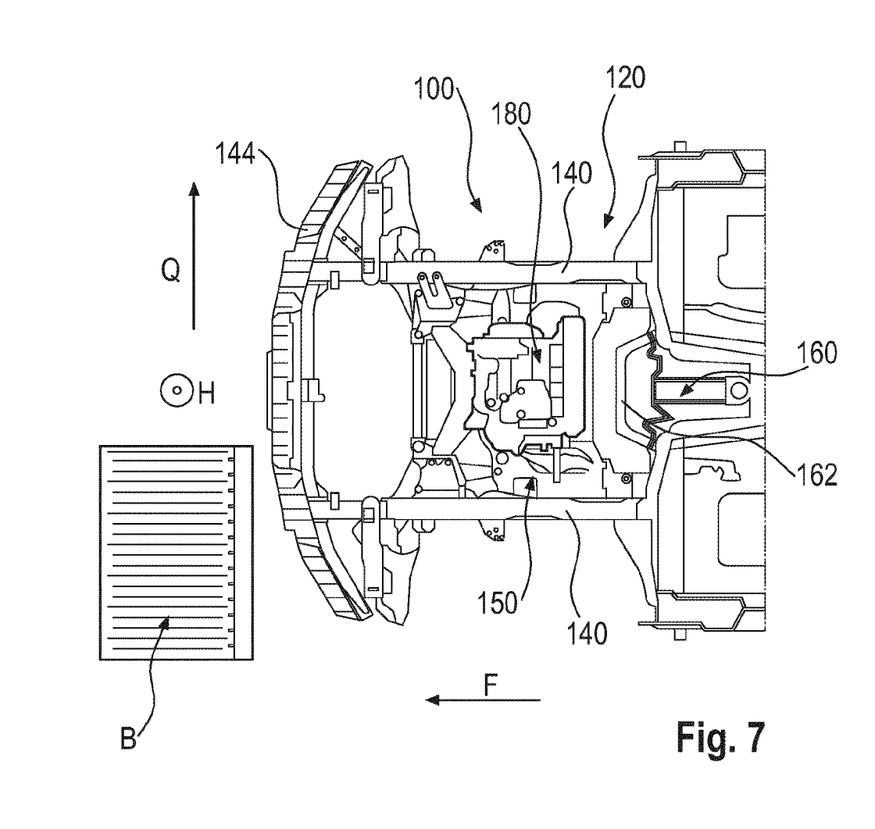
FIGS. 7 and 8 illustrate a collision between the motor vehicle and a deformable offset barrier, the motor vehicle being formed without the structural element according to the application.
Figure 8:
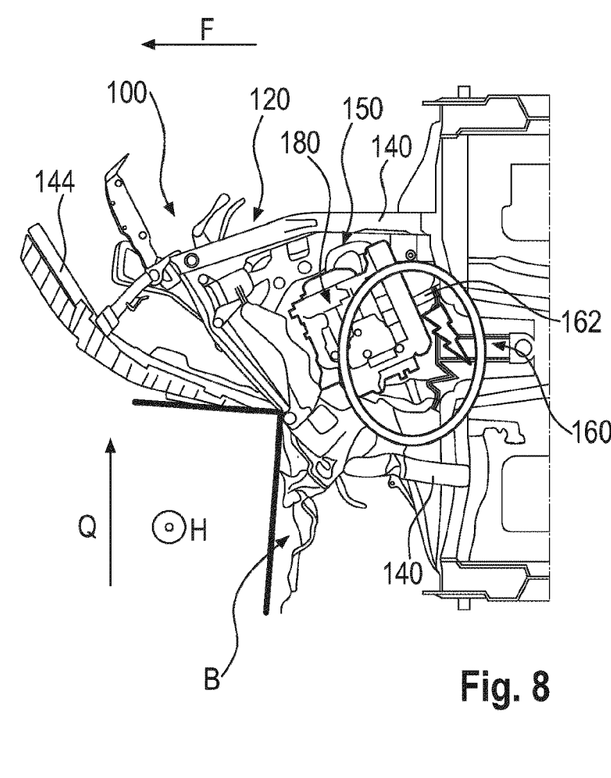
Figure 9:
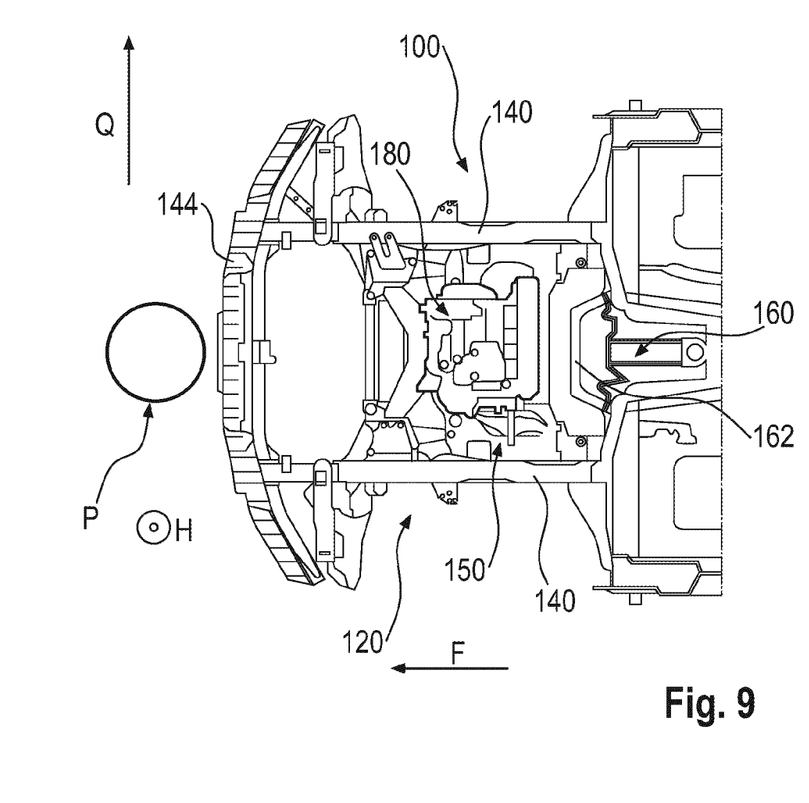
FIGS. 9 and 10 illustrate a frontal collision between the motor vehicle and a post, the motor vehicle being formed without the structural element according to the application.
Figure 10:
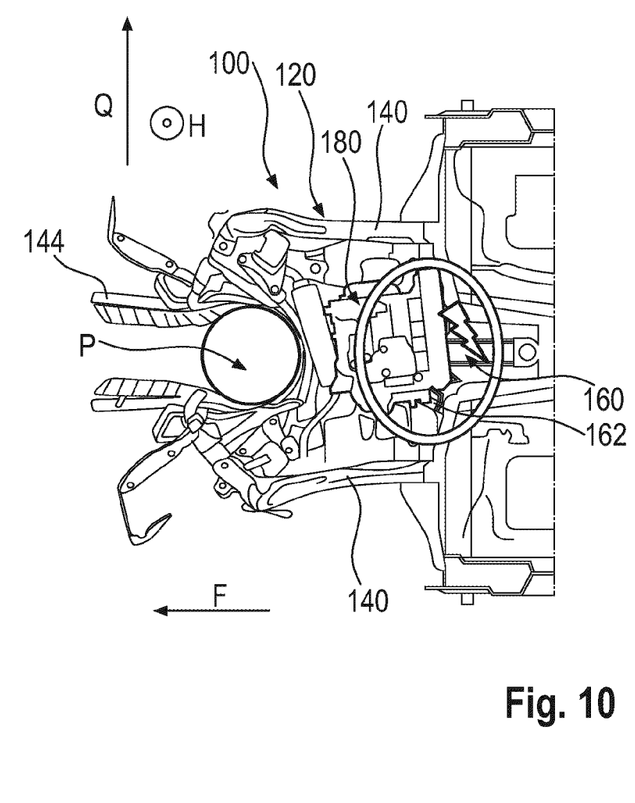

FIGS. 4 to 6 show a schematic illustration of the introduction of force into the chassis 120 of the motor vehicle 100 respectively in the event of a frontal collision with a post P, in the event of a frontal collision with a rigid barrier SB and in the event of a frontal collision with a deformable offset barrier B. The course of the introduction of force is represented by means of arrows here.

The invention claimed is:

1. A component for a chassis of a motor vehicle, comprising:
a structural element comprising at least two fastening sections and a central section that connects the two fastening sections, wherein
the fastening sections are each non-weldably fastenable to an outer face of a motor mount shoe of the chassis and/or to an outer face of a longitudinal member of the chassis by being configured to engage around the motor mount shoe and/or the longitudinal member, the outer face facing away from a center of the motor vehicle toward an outer skin of the motor vehicle,
wherein the central section is arrangeable on the chassis between a drive unit of the motor vehicle and/or a front axle of the motor vehicle on the one hand, and a traction battery of the motor vehicle and/or a power electronics system of the motor vehicle on the other, whereby impact energy is dissipated to support structures of the chassis away from the traction battery and/or the power electronics system.

2. The component according to claim 1, wherein the structural element is configured for the chassis of an electrically driven passenger motor vehicle.

3. The component according to claim 1, wherein the structural element is arrangeable on the chassis such that the central section extends in a motor vehicle transverse direction.

4. The component according to claim 1, wherein the structural element is arrangeable on the chassis such that the structural element extends substantially in a horizontal plane of the motor vehicle.

5. The component according to claim 1, wherein the structural element further comprises a further fastening section which is formed on the central section and by which the structural element is fastenable to an end wall of the chassis.

6. The component according to claim 1, wherein the structural element is formed as a bent pipe or a bent flat steel bar.

7. The component according to claim 1, wherein the fastening sections and/or the further fastening section each comprise at least one fastening opening for receiving a fastening screw and/or for receiving a fastening rivet.

8. A motor vehicle, comprising:
a chassis comprising a motor mount shoe and/or at least one longitudinal member wherein,
the motor mount shoe and/or the at least one longitudinal member are each provided with an outer face, the outer face facing away from a center of the motor vehicle toward an outer skin of the motor vehicle; and
a structural element comprising at least two fastening sections and a central section that connects the two fastening sections, wherein
the fastening sections are each non-weldably fastened to the outer face of the motor mount shoe of the chassis and/or to the outer face of the longitudinal member of the chassis by being configured to engage around the motor mount shoe and/or the longitudinal member,
wherein the central section is arranged on the chassis between a drive unit of the motor vehicle and/or a front axle of the motor vehicle on the one hand, and a traction battery of the motor vehicle and/or a power electronics system of the motor vehicle on the other, whereby impact energy is dissipated to support structures of the chassis away from the traction battery and/or the power electronics system.

\* \* \* \* \*